US009749685B2

(12) United States Patent
Tilaye et al.

(10) Patent No.: US 9,749,685 B2
(45) Date of Patent: Aug. 29, 2017

(54) APPARATUS, SYSTEMS AND METHODS FOR ACCESSING INFORMATION BASED ON AN IMAGE PRESENTED ON A DISPLAY

(71) Applicant: EchoStar Technologies L.L.C., Englewood, CO (US)

(72) Inventors: Swapnil Tilaye, Westminster, CO (US); Carlos Garcia Navarro, Boulder, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/807,178

(22) Filed: Jul. 23, 2015

(65) Prior Publication Data

US 2017/0026709 A1    Jan. 26, 2017

(51) Int. Cl.
| | |
|---|---|
| *H04N 21/44* | (2011.01) |
| *H04N 21/84* | (2011.01) |
| *H04N 21/41* | (2011.01) |
| *H04N 21/431* | (2011.01) |
| *H04N 21/4223* | (2011.01) |

(Continued)

(52) U.S. Cl.
CPC ....... *H04N 21/44008* (2013.01); *H04N 21/40* (2013.01); *H04N 21/41* (2013.01); *H04N 21/414* (2013.01); *H04N 21/4126* (2013.01); *H04N 21/41415* (2013.01); *H04N 21/422* (2013.01); *H04N 21/4223* (2013.01); *H04N 21/43* (2013.01); *H04N 21/431* (2013.01); *H04N 21/4307* (2013.01); *H04N 21/4312* (2013.01); *H04N 21/4316* (2013.01); *H04N 21/4882* (2013.01); *H04N 21/812* (2013.01);

(Continued)

(58) Field of Classification Search
None
See application file for complete search history.

(56) References Cited

U.S. PATENT DOCUMENTS

| 7,070,103 B2 | 7/2006 | Melick et al. |
| 7,986,913 B2 | 7/2011 | Wang |

(Continued)

FOREIGN PATENT DOCUMENTS

| EP | 2278497 | 1/2011 |

OTHER PUBLICATIONS

Flingo, "Flingo Industry-leading Automatic Content Recognition (ACR) Technology," Jun. 15, 2015.

(Continued)

*Primary Examiner* — Justin Shepard
(74) *Attorney, Agent, or Firm* — Lowe Graham Jones PLLC

(57) ABSTRACT

Systems and methods are operable to control operation of a portable media device based on machine readable information of a graphical artifact shown on a display concurrently with presentation of a video portion of a media content event. A portable media device, using a portable media device provisioned with an image capture device, captures at least one image that includes the display that is presenting the graphical artifact and the video portion of the media content event, identifies the graphical artifact in the captured at least one image, determines the machine readable data based on the identified graphical artifact, and operates the portable media device to perform at least one operation based on the determined machine readable data.

18 Claims, 4 Drawing Sheets

(51) Int. Cl.

| | | |
|---|---|---|
| *H04N 21/414* | (2011.01) | |
| *H04N 21/422* | (2011.01) | |
| *H04N 21/40* | (2011.01) | |
| *H04N 21/43* | (2011.01) | |
| *H04N 21/488* | (2011.01) | |
| *H04N 21/81* | (2011.01) | |
| *H04N 21/8547* | (2011.01) | |
| *H04N 21/858* | (2011.01) | |

(52) U.S. Cl.
CPC ......... *H04N 21/84* (2013.01); *H04N 21/8547* (2013.01); *H04N 21/8586* (2013.01)

(56) References Cited

U.S. PATENT DOCUMENTS

| | | |
|---|---|---|
| 8,090,579 B2 | 1/2012 | DeBusk et al. |
| 8,150,096 B2 | 4/2012 | Alattar |
| 8,401,224 B2 | 3/2013 | Rhoads |
| 8,688,600 B2 | 4/2014 | Barton et al. |
| 8,944,322 B2 * | 2/2015 | White ................ G06K 7/10554 235/383 |
| 9,047,516 B2 | 6/2015 | Archer |
| 2006/0049262 A1 * | 3/2006 | Elo ....................... G06T 1/0085 235/487 |
| 2011/0098056 A1 * | 4/2011 | Rhoads .................. G01C 21/20 455/456.1 |
| 2012/0008821 A1 | 1/2012 | Sharon et al. |
| 2012/0037695 A1 * | 2/2012 | Liu .................. G06F 17/30879 235/375 |
| 2012/0176540 A1 * | 7/2012 | Labrozzi ............ H04N 21/4312 348/468 |
| 2013/0006951 A1 | 1/2013 | Yu et al. |
| 2013/0246457 A1 | 9/2013 | Stojancic et al. |
| 2014/0020005 A1 | 1/2014 | Amselem et al. |
| 2014/0082646 A1 | 3/2014 | Sandland |
| 2014/0195548 A1 | 7/2014 | Harron |
| 2014/0250466 A1 | 9/2014 | Lieberkuhn et al. |
| 2014/0280265 A1 | 9/2014 | Wang |
| 2015/0014417 A1 * | 1/2015 | Finlow-Bates ...... G06K 7/1447 235/462.41 |

OTHER PUBLICATIONS

TVTAK, "TVTAK is Like Shazam for TV", Apr. 5, 2011.
Shazam, "Shazam Introduces Visual Recognition Capabilities, Opening up a New World of Shazamable Content," May 28, 2015.

* cited by examiner

US 9,749,685 B2

APPARATUS, SYSTEMS AND METHODS FOR ACCESSING INFORMATION BASED ON AN IMAGE PRESENTED ON A DISPLAY

BACKGROUND

Media devices, such as a set top box, are configured to receive media content events from a broadcasting system. Non-limiting examples of media content events include movies, news programs, sporting events, serial comedies or dramas, and other thematic-based media content even programming. Media content events may also include advertisements, commercials or the like.

The media content events may be communicated to the media device by a program service provider over the broadcasting system. Non-limiting examples of broadcasting systems include satellite systems, cable or other wire-based systems, or over the air (OTA) broadcasting systems. Media content events may also be accessed from other sources, such as a web site or an on-demand content source via the Internet or other suitable communication system.

The video portion and audio portion of a media content event is presented to a user(s) by components of a media presentation system. For example, the video portion of a present media content event may be viewed on a display of a television (TV) or the like. The audible portion of the media content event is presented as sounds emitted by a speaker or the like.

On occasion, a user viewing presentation of the media content event may be interested in accessing supplemental information about the media content event. For example, the user may be viewing the presented media content event at a public place or in a foreign country. Thus, the user may be interested in learning the title of the media content event, learning about the theme of the media content event, learning the names of actors in the media content event, or learning other information about the media content event. Preferably, the accessing the supplemental information may be made without disrupting presentation of the media content event on the primary display, which also might be being viewed by other individuals. Or, the user may be interested in accessing other types of supplemental information, such as closed captioning text and/or an alternative language audio track.

Accordingly, there is a need in the arts to allow a user to access information related to a presented media content event, particularly when accessing such information would interfere with presentation of the media content event to other viewers.

SUMMARY

Systems and methods of controlling operation of a portable media device based on machine readable information of a graphical artifact shown on a display concurrently with presentation of a video portion of a media content event are disclosed. An exemplary embodiment, using a portable media device provisioned with an image capture device, captures at least one image that includes the display that is presenting the graphical artifact and the video portion of the media content event, identifies the graphical artifact in the captured at least one image, determines the machine readable data based on the identified graphical artifact, and operates the portable media device to perform at least one operation based on the determined machine readable data.

BRIEF DESCRIPTION OF THE DRAWINGS

Preferred and alternative embodiments are described in detail below with reference to the following drawings.

DETAILED DESCRIPTION

Figure 1:
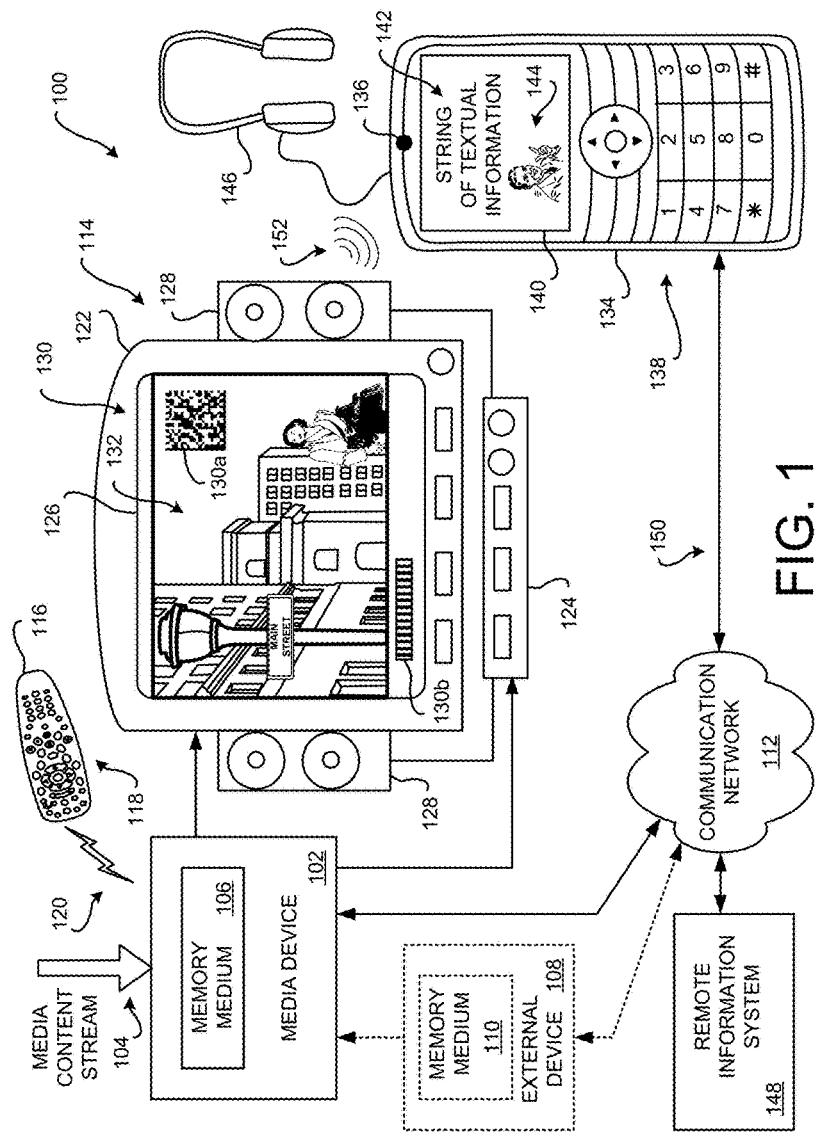
FIG. 1 is a block diagram of an embodiment of a media content event information system operating in an example environment.

FIG. 1 is a block diagram of an embodiment of a media content event information system 100 operating in an example environment. The exemplary embodiment of the media content event information system 100 is implemented in an exemplary environment that comprises a media device 102 that receives a media content stream 104.

An exemplary media device 102 includes, but is not limited to, a set top box (STB) that is communicatively coupled to a broadcast system. Other embodiments of the media device 102 include a television (TV), a digital video disc (DVD) player/recorder, a Blue-ray player/recorder, a game playing device, or a personal computer (PC). The media device 102 is configured to present selected media content events that are received in the media content stream 104. Some media devices 102 may include memory medium 106 that is configured to store selected media content events for later playback.

The media content stream 104 may comprise one or more streaming media content events provided from the media content broadcast facility over the broadcast system (not shown) operated by a media content service provider. A media content event may be accessed by the media device 102 from an external device 108 that is communicatively coupled to the media device 102. The external device 108 may access the stored media content event from any suitable memory medium 110. For example, a DVD player or Blue-ray player may access the media content event from a disk-type memory medium 110. Or, the external device 108 may be a suitable electronic device that has a memory medium itself that has stored the media content event and/or that is configured to access the media content event from another type of memory medium and/or a remote source. Alternatively, or additionally, the external device 108 may be a remotely located device or system, such as an internet site or video-on demand site, that is communicatively coupled to the media device 102 via the communication network 112.

The media device 102, when in operation, is configured by a user to select one of a plurality of simultaneously broadcast media content events for presentation on one or more components of a media presentation system 114. User selection may be facilitated by operation of a remote control 116, wherein the user actuates one or more of the controllers 118 disposed on the surface of the remote control 116. The remote control 116 typically communicates with the media device 102 via an infrared (IR) or radio frequency (RF) wireless signal 120.

The exemplary media presentation system 114 includes a visual display device 122, such as a television (hereafter, generically a TV) or the like, and an audio presentation device 124, such as a surround sound receiver or the like. Other types of output devices may also be coupled to the media device 102, including those providing any sort of stimuli sensible by a human being, such as temperature, vibration and the like. The video portion of the media content event is displayed on the display 126 and the audio portion of the media content event is reproduced as sounds by one or more TV speakers (not shown). Alternatively, or additionally, the audio portion of the media content event may reproduced as sounds by a plurality of speakers 128 of the audio presentation device 124. The volume output of the audio portion may be controllable at the audio presentation device 124, and/or may be controllable at the media device 102.

In the various embodiments of the media content event information system 100, one or more graphical artifacts 130 are presented on the display 126 concurrently with presentation of the video portion 132 of the media content event, here illustrated for conceptual purposes as a lady viewing a street sign in a city. The graphical artifact 130 contains an optical machine-readable representation of data of interest (wherein machine readable data is encoded thereon using a plurality of data marks).

In the event that the user is interested on accessing information about, or pertaining to, the presented media content event, the user operates their portable media device 134 to capture at least one image (photograph) or to capture a short video clip (moving picture) that includes at least the region of the display 126 that is presenting the graphical artifact 130. The captured image/video clip is analyzed to identify the graphical artifact 130. Once identified, the machine readable data residing in the graphical artifact 130 is determined. The determined data is then used by the portable media device 134 to perform one or more specific operations. If multiple graphical artifacts 130 are presented at the time of capture of the image/video clip, a plurality of different operations may be performed by the portable media device 134 based on the determined data in the plurality of identified graphical artifacts 130.

The portable media device 134 includes an image capture device 136 that is operable to capture an image or a video clip. Typically, capture of the image/video clip is initiated by user actuation of one or more controllers 138 disposed on the surface of the portable media device 134. Preferably, the portable media device 134 includes an optional display 140 upon which textual information of interest 142 and/or an image/video clip of interest 144 may be presented. Alternatively, or additionally, the portable media device 134 includes speakers (not shown) or may be coupled to an audio reproduction device 146, such as a set of head phones, ear buds, or the like, so that audible (sound) information may be presented to the user via the portable media device 134.

For purposes of conceptually describing embodiments of the media content event information system 100, the exemplary portable media device 134 is illustrated as a type of cellular telephone, smart phone, or the like, that is provisioned with an image capture device 136, interchangeably referred to herein as a camera 136. Any suitable portable media device 134 may be used by the user to capture an image/video clip presenting one or more graphical artifacts 130, determine the machine readable data in a graphical artifact 130, and then perform at least one operation in accordance with the determined data of the graphical artifact 130. For example, the portable media device 134 has a display 140 upon which text determined from the machine readable data of a graphical artifact 130 is determined and then presented thereon. Other non-limiting examples of portable media devices 134 include, but are not limited to, digital cameras, personal device assistants (PDAs), notepads, note books, portable computers, or the like.

In an example embodiment, an exemplary graphical artifact 130a is overlaid on top of a portion of the video portion 132 of the presented media content event. The graphical artifact 130a may be presented using a picture in picture (PIP) format or the like. Here, the example graphical artifact 130a covers a small portion of the presented image of the media content event, thus obscuring the covered portion of the media content event from view.

Alternatively, or additionally, a graphical artifact 130 may be presented on a portion of the display 126 that is not currently being used for presentation of the video portion 132 of the media content event. For example, the graphical artifact 130b is illustrated as being presented as below the field of view of the media content event.

The example graphical artifact 130b presents the machine readable data of interest by varying the width and/or spacing of one or more rows of parallel lines (data marks), and may be referred to as linear or one-dimensional (1D) graphical artifact 130. Alternative embodiments of a graphical artifact 130 may employ any suitable markings on a background (field) to represent the data. The markings used by a graphical artifact 130 may be, but are not limited to, lines, bars, rectangles, dots, hexagons and/or other geometric patterns in two dimensions (2D). A nonlimiting example of a 2D data format graphical artifact 130b is a quick response (QR) Code™. Preferably, the format of machine readable data representation used by a graphical artifact 130 conforms to one or more industry standards, such as, but not limited to, the ISO/IEC 15416 (linear), the ISO/IEC 15415 (2D), the European Standard EN 1635, the ISO/IEC 15416, the ISO/IEC 18004:2006, the PDF417, and/or the ANSI X3.182 standards. Any suitable machine-readable data format, now used or later developed, may be used to present data of interest using a graphical artifact 130.

One or more graphical artifacts 130 may be presented at any selected location on the display 126 during presentation of the media content event. In some applications, the graphical artifact 130 may be presented alone on the display 126 during a pause and blanking (removal) of the video portion 132 of the media content event.

The graphical artifact 130 may be any suitable size. For example, a larger graphical artifact 130 may be used to incorporate a larger amount of data. If less data is represented, a smaller graphical artifact 130 may be used.

Alternatively, or additionally, a larger graphical artifact 130 may be used if the user is expected to be farther away from the display 126, thereby improving the readability (discernability) of the machine readable data in a captured image. For example, a user in a home environment may be relatively close to the display 126. In contrast, a user at a sports bar may be at a relatively long distance from the display 126.

Alternatively, or additionally, a size of a graphical artifact 130 may be varied based on the dimensions of the display 126. For example, a proportionately larger graphical artifact 130 may be encoded and presented if the display is a small TV, notepad device, or the like (wherein the proportion of the size/area of the graphical artifact 130 is increased relative to the size/area of the display 126). Alternatively, a proportionately smaller graphical artifact 130 may be encoded and presented if the display 126 is a large screen TV or monitor.

In an example embodiment, the graphical artifact 130 is preferably presented with no degree of transparency. Thus, the example graphical artifact 130a blocks (completely obscures) viewing of a small portion of a currently presented video frame of the media content event. That is, the presented graphical artifact completely obscures a portion of the media content event that corresponds to the predefined region that is used for presentation of the graphical artifact. Alternatively, the graphical artifact 130 may be presented with some degree of transparency (partially obscuring).

The graphical artifact 130 may be presented using any suitable color. In an example embodiment, the data is represented using black markings on a white background or field. In some embodiments, the data is presented using black markings or another suitable color on a transparent background, thus permitting partial viewing of the covered portion of the media content event by the user.

In practice, the user, while viewing a media content event, captures at least one still image and/or a short video clip that includes at least the graphical artifact 130. The captured image/video clip may include more than just the graphical artifact 130. In response to capturing the still image and/or short video clip, the portable media device 134 is operable to identify the graphical artifact 130 in the portion of the captured image/video clip. For example, the user may capture a still image and/or short video clip that includes most or all of the field of view presented on the display 126. The captured image/video clip may even include visible portions of the visual display device 122 and optionally visible surrounding background objects.

The machine readable data of the graphical artifact 130, once determined by the portable media device 134, is operable to cause the portable media device 134 to perform some specific operation. In the simplified example shown in FIG. 1, the machine readable data includes textual information (the illustrated "string of textual information") that is presented on the display 140 of the portable media device 134. For example, the machine readable data of a graphical artifact 130 may include the title of the media content event. If the user is at a bar or the like that has a TV presenting a sporting event, movie, show or the like, the user may be informed of the title. Further, additional information may be optionally included in the machine readable data, such as the names of actors in a move and/or a currently presented scene, a brief description of the theme of the media content event, the names of players and/or teams of a sporting event, current score in a sporting event, and/or any other textual information that may be of interest to the user. The textual information may include as little or as much information as desirable. If the entirety of the textual information cannot be readily presented on the display 140, portions of the textual information may be presented to the user in a scrolling manner (such as by using automatic scrolling and/or by enabling scrolling under the control of the user) or in a serial manner (such as by using an automatic paging operation and/or by using a user controlled paging function or the like).

Alternatively, or additionally, the machine readable data of a graphical artifact 130 may include image information. For example, an image 144 showing a speaking man is shown on the display 140 of the portable media device 134. The image 144 may be a still image or a video image.

Alternatively, or additionally, the machine readable data of a graphical artifact 130 may include audio information. For example, words spoken by the man shown in the example image 144 may be audibly presented by the audio reproduction device 146 that is coupled to the portable media device 134 or from speakers (not shown) of the portable media device 134.

One skilled in the art appreciates that the amount of machine readable data included in a graphical artifact 130 will, at some point, become limited by the available usable space in the graphical artifact 130. That is, the size and/or data format used by a graphical artifact 130 will have some maximum amount of machine readable data that may be encoded into the graphical artifact 130. Accordingly, the graphical artifact 130 may alternatively or additionally include instructions that cause the portable media device 134 to perform an operation that accesses additional supplemental information from another electronic device.

In the example environment of FIG. 1, a remote information system 148 is illustrated as being coupled to the communication network 112. The communication network 112 is illustrated as a generic communication system. In one embodiment, the communication network 112 comprises a cellular telephone system, such as a radio frequency (RF) wireless system. Accordingly, the portable media device 134 includes a suitable transceiver. Alternatively, the communication network 112 may be a telephony system, the Internet, a Wi-Fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the portable media device 134 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the portable media device 134 may be configured to communicate over combination systems having a plurality of segments which employ different formats for each segment that employ different technologies on each segment.

The machine readable data in the captured graphical artifact 130 may cause the portable media device 134 to establish a communication link 150, via the communication network 112, to the remote information system 148. All or portions of the communication link may be wireless. Then, the portable media device 134 can retrieve any suitable amount and/or type of supplemental information of interest from the remote information system 148, via the communication network 112, which may then be presented by the portable media device 134 to the user.

The remote information system 148 may be an internet site or the like. Alternatively, the remote information system 148 may be an on-demand system operated by the provider or another entity, associated with the media content event being presented on the display 126. In such applications where the portable media device 134 establishes a communication link to the remote information system 148, via the communication network 112, the machine readable data in a graphical artifact 130 may include connection information, such as a uniform resource located, internet address or the like, and specific instructions that cause the portable media device 134 to establish the communication link 150 to communicatively connect to the remote information system 148. Further, the machine readable data in a graphical artifact 130 may include more specific instructions to cause the portable media device 134 to access specific information available from the remote information system 148. Such instructions may, in an example embodiment, comprise executable script (a small non-compiled program written for a scripting language or command interpreter) or other suitable software instructions that cause the remote information system 148 to perform specific operations in support of an operation that is to be performed by the portable media device 134.

In an example application, the user may be in an operating environment where the user is not able to hear, or at least clearly discern, the audio portion of the media content event that is being output from the media presentation system 114. For example, the user may be in a relatively noisy sports bar during presentation of a popular sporting event. In this nonlimiting example, the user may orient (point) their portable media device 134 towards the display 126, and then capture a still image and/or short video clip that includes the graphical artifact 130. The machine readable data in the graphical artifact 130 may then cause the portable media device 134 to establish the communication link 150 to the remote information system 148, and then access closed captioning text of the media content event. The closed captioning text for the sporting event may then be presented to the user on the display 140 of their portable media device 134 (presumably in synchronism with the presented audio portion of the media content event).

Alternatively, or additionally, the audio portion of the media content event may be accessed and presented to the user by the audio reproduction device 146 that is coupled to the portable media device 134 or from speakers (not shown) of the portable media device 134 (presumably in synchronism with the presented audio portion of the media content event). For example, the user might listen to the audio portion of the presented sporting event using the audio reproduction device 146 that is coupled to the portable media device 134 or from speakers (not shown) of the portable media device 134. Alternatively, the received audio content may be different that the audio content of the presented media content event, such as if the user is viewing a sporting event on the display 126 and then listens to a local radio station broadcast covering the sporting event.

In some applications, the machine readable data of the graphical artifact 130 may cause the portable media device 134 to access a remote information system 148 controlled by the content provider such that the audio portion (and optionally the video portion) of the media content event is streamed to the portable media device 134 (presumably in synchronism with the presented audio portion of the media content event). For example, the media content event may be a broadcast of the media content event via a content distribution system. The machine readable data may be configured to cause the portable media device 134 to access and then present the same source of content (and therefore be presented in synchronism with the media content event presented on the media presentation system 114). Alternatively, the remote information system 148 may separately stream the media content event using a different media content distribution system such as the Internet or the like. Synchronism information (time stamps or other markers) may reside in the accessed content to facilitate synchronism of the presentation of content on the portable media device 134 with the corresponding presentation of content being presented on the media presentation system 114.

As another simplified application of the media content event information system 100, the user may be in their hotel while visiting a foreign language country. Here, the user may not be able to understand the local foreign language presentation of the audio portion of the media content event being presented by the media presentation system 114. The user may point their portable media device 134 towards the display 126, and then capture a still image and/or short video clip that includes the graphical artifact 130. The machine readable data in the graphical artifact 130 may then cause the portable media device 134 to establish a communication link to the remote information system 148, and then access closed captioning text and/or the audio portion of the media content event in a native language of the user. The closed captioning text in the user's native language may then be presented to the user on the display 140 of their portable media device 134. Alternatively, or additionally, the audio portion of the media content event in the user's native language may be presented on by the audio reproduction device 146 that is coupled to the portable media device 134 or from speakers (not shown) of the portable media device 134 (presumably in synchronism with the presented audio portion of the media content event).

Synchronism information (time stamps or other markers) may reside in the accessed content to facilitate synchronism of the content presented closed captioning text by the portable media device 134 with the corresponding video portion of the media content event being presented on the media presentation system 114. Any suitable synchronization technology may be used to synchronize presentation of supplemental information by the portable media device 134 with presentation of the media content event being presented by the media presentation system 114.

As yet another simplified application example, the machine readable data in the captured graphical artifact 130 may cause the portable media device 134 to access and present information that is indirectly related to the content of the media content event being presented on the media presentation system 114. For example, an object of interest, such as a car, building, actor, team member, business or the like, may be currently shown in the video portion of the media content event on the display 126 of the media presentation system 114. Here, an advertisement or other information relating to the object of interest may be accessed and presented to the user via their portable media device 134. As another nonlimiting example, the object may be an athlete that is performing in a sporting event being presented by the media presentation system 114. In such an application, supplemental information about that particular athlete's historical performance record may be presented on the portable media device 134.

In some applications, the information of interest may change over time as presentation of the media content event progresses. Once the machine readable data in the graphical artifact 130 has caused the portable media device 134 to establish a communication link with the remote information system 148, the remote information system 148 may be maintained during continued presentation of the media content event. Accordingly, the remote information system 148 may continuously provide updated or changed supplemental information to the portable media device 134 for presentation to the user. For example, if the media content event is a sporting event, the portable media device 134 may receive supplemental information (visual and/or audio) that pertains to the ongoing sporting event and or to various advertisements. Alternatively, after the supplemental information of interest has been communicated from the remote information system 148 to the portable media device 134, the communication link 150 may be automatically closed or terminated.

The graphical artifact 130 may be generated in a variety of manners. Preferably, the graphical artifact 130 is generated in a predefined manner by an entity prior to presentation of the media content event to the user. The creating entity may be the programming service provider that sources the media content stream, a producer of the media content event, or another interested third party. Alternatively, or additionally, the media device 102 itself may generate a graphical artifact 130 based on received instructions and/or the supplemental information.

To generate a graphical artifact 130, the desired operation (or series of operations) that the portable media device 134 is to perform must first be determined. Then, corresponding machine readable data must be determined. The determined machine readable data is then encoded into a graphical artifact 130. Thus, the machine readable data may be in the form of script or the like.

As a first nonlimiting example of the type of information that may be presented to the user, the graphical artifact 130 may be used to present a limited amount of textual and/or graphical information (such as the title of the media content event, for example). Accordingly, the textual and/or graphical information, such as the movie title or the like, is directly encoded into the graphical artifact 130 as machine readable data.

As another nonlimiting example, if graphical artifact 130 is to cause the portable media device 134 to access one or more remote information systems 148, then the operation instructions that specify how the communication link 150 between the portable media device 134 and the remote information system 148 over the communication network 112 may be required. Also, operating instructions identifying the particular content or supplemental information that is to be accessed and communicated from the remote information system 148 to the portable media device 134 is encoded as machine readable data in the graphical artifact 130.

Alternatively, or additionally, the operating instructions may be device dependent (device specific) type instructions. For example, instructions encoded as machine readable data for a cell phone or smart phone may not be suitable to control operation of a laptop computer. In such situations, the machine readable data may include device specific instructions for a plurality of different portable media devices 134. Alternatively, a plurality of different graphical artifacts 130 may be generated, wherein each graphical artifact 130 encodes device dependent instructions of a single portable media device 134 type. The plurality of different graphical artifacts 130 (each configured to effect the same operation) may be presented on the display 126 of the media presentation system 114. The plurality of different graphical artifacts 130 may be concurrently presented or may be serially presented. Here, a particular portable media device 134 will operate as intended only when it determines operating instructions that it is configured to recognize. The other graphical artifacts 130 that cannot be read, or that have operating instructions that are not recognized, are simply disregarded by the portable media device 134.

In some embodiments, the media device 102 may be configured to present, in a predefined manner (based on a priori information about the portable media device 134), a particular device specific graphical artifact 130. For example, if the user is watching the media content event at their home, device specific graphical artifacts 130 may be presented on the user's media presentation system 114 since the type of portable media device 134 being used by the user may be readily determinable and/or may be known beforehand. Alternatively, or additionally, the media device 102 may be configured to detect a particular portable media device 134, determine the type of portable media device 134, and then present the device specific graphical artifact 130 that corresponds to the detected portable media device 134.

In some embodiments, one or more graphical artifacts 130 are added directly into the media content event prior to broadcasting the media content event, and/or prior to storing the media content event in a particular memory medium 110. Here, the graphical artifact 130 is inserted onto the one or more selected image frames of the graphical portion of the media content event. Then, the media content event with the one or more graphical artifacts 130 therein are communicated to the media device 102 in the media content stream 104. Alternatively, or additionally, the media content event with the one or more graphical artifacts 130 may be stored in the memory medium 110, and/or may have been stored in another media memory medium. For example, but not limited to, the media device 102 may access the media content event with one or more graphical artifacts 130 from the external device 108 or the remote information system 148. Thus, when the media content event is received in the media content stream 104, from the external device 108, and/or remote information system 148, the graphical artifact 130 is presented concurrently with the video portion of the media content event.

Alternatively, or additionally, the media device 102 may separately receive the instructions and/or the supplemental information that is intended to be in a graphical artifact 130. The instructions and/or the supplemental information may be received in the media content stream 104 and/or from a remote source, such as, but not limited to, the external device 108 or the remote information system 148. The received instructions and/or the supplemental information is used to define the machine readable data, and includes synchronization information that specifies when that particular generated graphical artifact 130 is to be presented during presentation of the media content event. The media device 102 may then generate a graphical artifact 130 based on the received instructions and/or the supplemental information. The generated graphical artifact 130 may then be presented on the display 126 (concurrently with presentation of the separately received media content event) at an intended time (based on the synchronization information).

Further, the media device 102 may generate a device specific graphical artifact 130 based on the user's particular portable media device 134. That is, the type of portable media device 134 may have been predefined to the media device 102 (via a suitable user interface menu or the like that permits the user to specify or identify the type of portable media device 134). Then, the media device 102 may generate a device specific graphical artifact 130 that has device specific machine readable data configured for reading by and/or for an operation of the particular portable media device 134.

In some embodiments, one or more predefined graphical artifacts 130 may be separately communicated to the media device 102. The separately received graphical artifacts 130 may then be stored in the memory medium 106 of the media device 102 or stored in another suitable memory medium. The received one or more predefined graphical artifacts 130 may be included in the media content stream 104. Alternatively, or additionally, the predefined graphical artifact 130 may be accessed or provided by a remote electronic device, such as the remote information system 148, that is communicatively coupled to the media device 102 via the communication network 112.

In some embodiments, the one or more graphical artifacts 130 may be separately communicated to the media device 102 in synchronism with a broadcast or delivery of the media content event to the media device 102. Here, a graphical artifact 130 is presented when received (presumably in synchronism with the intended time of presentation of the corresponding portion of the media content event). Alternatively, each separately communicated predefined graphical artifact 130 may include synchronization information that specifies when that particular graphical artifact 130 is to be presented during presentation of the media content event. For example, the graphical artifact 130 may include or be associated with a time stamp or the like that specifies when it is to be presented during presentation of the media content event. Optionally, the information may also specify the presentation location and presentation size of the graphical artifact 130.

In some embodiments, after a graphical artifact 130 has been generated by and/or has been provided to the media device 102, particulars of the presentation of the graphical artifact 130 on the display 126 may be determined by the media device 102. That is, when the media device 102 controls presentation of the graphical artifact 130, the timing of the presentation of the graphical artifact 130 and the location of the presentation of the graphical artifact 130 must be determinable.

Timing of presentation of a graphical artifact 130 may be controlled in a variety of manners. If a predefined graphical artifact 130 has been inserted into or added into selected image frames of the media content event (prior to presentation of the media content event by the media device 102), the presentation timing is inherently controlled (since the graphical artifact 130 in included in a particular image frames of the media content event). Alternatively, a graphical artifact 130 may have or include timing information to control the presentation time of the graphical artifact 130. For example, a time stamp corresponding to presentation times in the media content event may be included in or associated with a predefined or generated graphical artifact 130. When the corresponding time in the presentation of the media content event is reached, the associated graphical artifact 130 is then presented on the display 126. Alternatively, or additionally, an image frame identifier(s) that identifies a particular image frame(s) of the media content event may be included in or associated with a predefined or generated graphical artifact 130. When the corresponding image frame is presented on the display 126, the associated graphical artifact 130 is then concurrently presented on the display 126. Such information may be determined and provided as instructions and/or as supplemental information that is encoded as machine readable data into a predefined or generated graphical artifact 130.

Presentation location and/or presentation size of a presented graphical artifact 130 must also be controlled by embodiments of the media content event information system 100. If the predefined graphical artifact 130 is inserted into or added into the media content event prior to presentation, then the presentation location and/or presentation sized of the graphical artifact 130 may be predefined by the entity that is creating and inserting the graphical artifact 130 into the media content event. For example, the graphical artifact 130a may be inserted into the upper right hand corner (the presentation location) at a predefined size of one or more selected image frames of the media content event. When the media content event is later presented on the display 126, the graphical artifact 130 is presented at its predetermined location and at its predetermined size when those particular image frames are presented.

Alternatively, the media device 102 may present the graphical artifact 130 in a location and/or at a size that is selected by the media device 102 or that is user defined. For example, if the media content event is a movie being presented in a letter box format that presents the media content event using a specific aspect ratio (with mattes or black bars above and/or below the presented video image), the media device 102 may automatically present the graphical artifact 130 in matte or black bar region of the display 126 of the media presentation system 114. Alternatively, or additionally, the user may specify, via a user input menu or the like, that a graphical artifact 130b is to be presented in the matte or black region of a display when the media content event in presented using the letter box or like format.

At other times, the entirely of the field of the display 126 may be used to present the video portion of the media content event. Accordingly, the graphical artifact 130 may be presented in a predefined location on the display 126. As an example, the user may specify that the example graphical artifact 130a is to be presented in the upper right hand corner of the display 126. In some embodiments, the user may predefine the presentation location and/or presentation size of a graphical artifact 130 via a set up menu or the like.

Alternatively, the media device 102 may use image analysis logic that is configured to identify a region of the image of the media content event that is suitable for presentation of a graphical artifact 130. Here, presentation of the graphical artifact 130 in the identified region is likely not to have a significant negative impact on the presentation of the media content event. For example, the media device 102 may perform an analysis of moving edges, where a region of the image with few moving edges may be identified as a desirable region (presentation location) for presentation of a graphical artifact 130.

Alternatively, or additionally, color palette information may be analyzed to identify a region of the image of the media content event may have a particular color(s) and/or a particular size that have the same or similar color, and thus may be suitable for presentation of a graphical artifact 130. For example, regions of the image having a single color and/or a particular color may be used to identify a desirable location for presentation of a graphical artifact 130.

In some applications, the graphical artifact 130 is generated and inserted into the image data prior to delivery to the media device 102. Accordingly, another electronic device generating the graphical artifact 130 and inserting the graphical artifact 130 into the image data may perform the above-described image analysis to identify a desirable presentation location for presentation of the graphical artifact 130.

In some embodiments, the instructions and/or the supplemental information may be presented as an audio artifact 152. The instructions and/or the supplemental information may be audibly presented as a squelch signal or the like that is detected by the portable media device 134. In some embodiments, the frequency of the emitted audio artifact 152 is outside of the frequency hearing range of a human, and is therefore not discernible (heard) by the user. The audio artifact 152 may be periodically emitted so that when the portable media device 134 is detecting sounds over some duration, the audio artifact 152 will be emitted at least one time.

Figure 2:
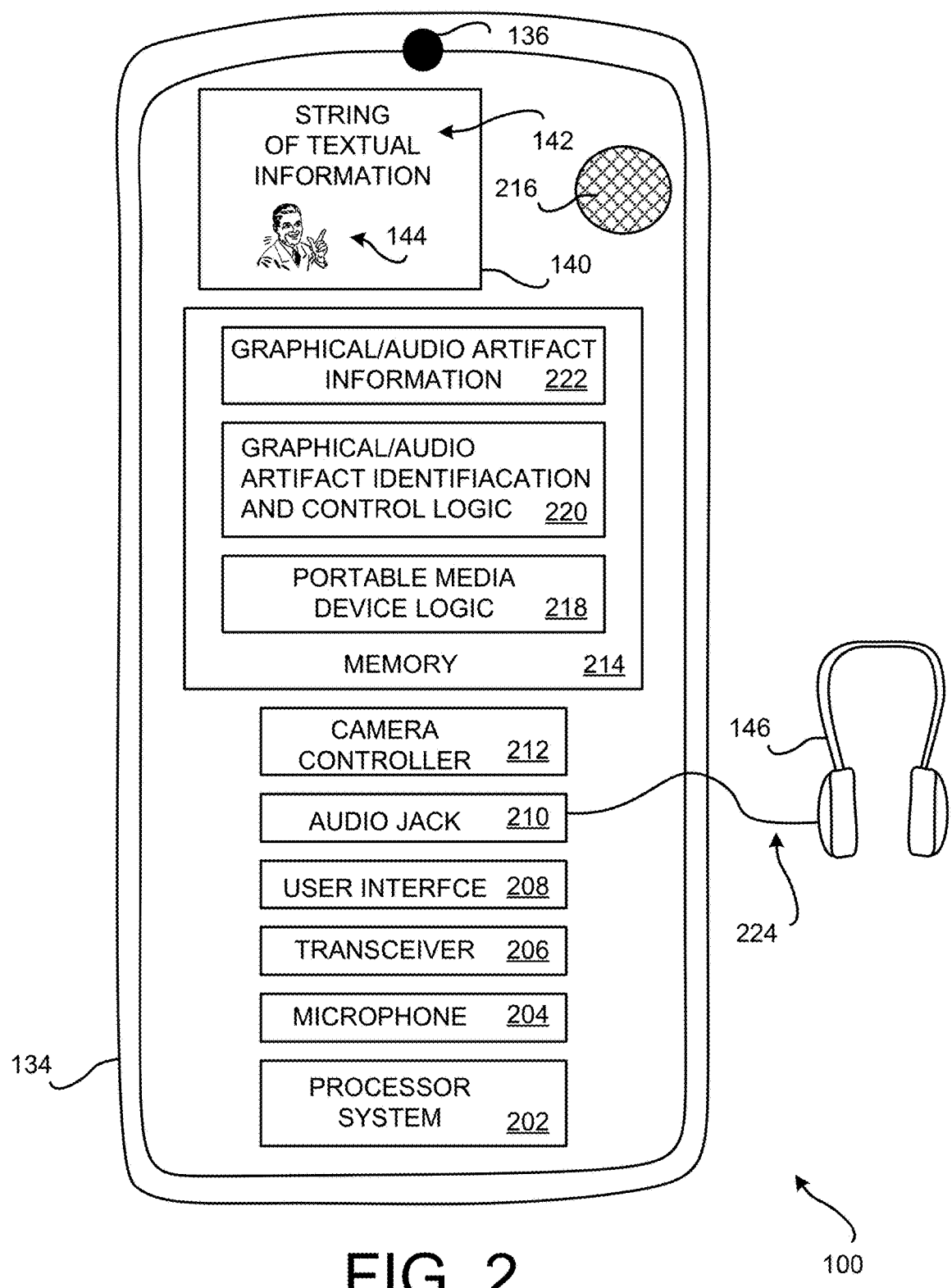
FIG. 2 is a block diagram of an exemplary portable media device provisioned with an embodiment of the media content event information system.

FIG. 2 is a block diagram of an exemplary portable media device 134 provisioned with an embodiment of the media content event information system 100. The non-limiting exemplary portable media device 134 comprises a processor system 202, a microphone 204, a transceiver 206, a user interface 208, an optional audio jack 210, a camera controller 212, a memory 214, an image capture device 136, a speaker 216, and a display 140. The memory 214 comprises portions for storing the portable media device logic 218, the graphical/audio artifact identification and control logic 220, and the graphical/audio artifact information 222. In some embodiments, the portable media device logic 218 and the graphical/audio artifact identification and control logic 220 may be integrated together, and/or may be integrated with other logic. In other embodiments, some or all of these memory and other data manipulation functions may be provided by and using remote server or other electronic devices suitably connected via the Internet or otherwise to a client device, such as the external device 108 (FIG. 1) or another electronic device. Other portable media devices 134 may include some, or may omit some, of the above-described media processing components. Further, additional components not described herein may be included in alternative embodiments.

The functionality of the portable media device 134, here a cellular phone or a smart phone, is now broadly described. The portable media device 134 is operable to place and receive telephonic conversations with other portable media devices 134 or other electronic devices (such as a personal computer, laptop computer, a note pad, a netbook, or the like using a Voice over Internet Protocol (VoIP).

The microphone 204 is configured to capture audio content in the proximity of the portable media device 134. For example, if the portable media device 134 is a cellular phone or smart phone, the microphone may be used to capture the user's voice during a telephonic conversation. In some embodiments, the microphone 204 may be used to capture a portion of the audio portion of the media content event that might have therein an audio artifact 152 (FIG. 1).

During telephonic conversations, the voice of the other party in the conversation may be output from the speaker 216 so that the user of the portable media device 134 may hear that person's spoken words or other audio content. In some instances, the audio output is optionally communicated to the audio reproduction device 146 that is coupled to the portable media device 134, via a wire connector 224 coupled to the audio jack 210.

Such telephonic conversations may also include an exchange of video and/or still images. Received video and/or still images are presentable on the display 140 of the portable media device 134. Such video and/or still images may be received and transmitted by the transceiver 206. The transceiver 206 may be configured to communicate with a mobile wireless communication network, a Wi-Fi system, or other suitable wireless system (or subsystem) to communicate with other electronic devices via the communication network 112 (FIG. 1).

Communication and capture of video and/or still images are managed by the camera controller 212 that controls operation of the image capture device 136. The camera controller 212 may be executed by firmware, software, or a combination thereof. Any suitable camera controller 212 and/or image capture device 136 may be included in the portable media device 134. For example, many cellular phones or smart phones are provisioned with a high quality camera that employs a charge-coupled device (CCD) and lens.

The user interface 208 is configured to receive user inputs. For example, the user interface 208 manages control of the various controllers 138 (FIG. 1) disposed on the surface of the portable media device 134. One of more of these controllers 138 are preferably configured to capture still and/or video images. When used in conjunction with embodiments of the media content event information system 100, the user's operation of one or more of the controllers 138 (FIG. 1) associated with operation of the image capture device 136 operates the portable media device 134 to capture (photograph) a still or video image. When using the media content event information system 100, the captured image includes a graphical artifact 130 presented on the display 126 of the media presentation system 114 (FIG. 1).

The processes performed by the portable media device 134 relating to the processing and/or communication of image and audio information are generally implemented by the processor system 202 while executing the portable media device logic 218. Further, a portable media device 134 may be another type of portable electronic device, such as a laptop computer, a PDA, a notepad, or the like. Thus, the portable media device 134 may perform a variety of functions related to the processing and presentation of image and/or audio information in received and transmitted communications, and perform a variety of other operations.

When the user is viewing a media content event being presented by the media presentation system 114, the user may orient the image capture device 136 towards the display 126 to capture a still image and/or a short video clip. The graphical/audio artifact identification and control logic 220 receives the still image and/or short video clip, and process the image information therein to identify one or more graphical artifacts 130 which have been included in the captured still image and/or short video clip. Thus, the graphical/audio artifact identification and control logic 220 has logic that is able to discriminate an image of the graphical artifact 130 from image data surrounding the graphical artifact 130.

In an example embodiment, one or more of the dedicated controllers may be configured to capture a still image and/or short video clip that has a graphical artifact 130 therein. Thus, a first one or group of controllers 138 (FIG. 1) may be configured to capture photographic images without a graphical artifact 130 (such as for recreational image capture of scenic views, friends, family or the like) and a different second one or group of controllers 138 may be configured to capture images that have one or more graphical artifacts 130 therein. Accordingly, image capture using the second controller(s) 138 automatically causes the graphical/audio artifact identification and control logic 220 to search for at least one graphical artifact 130.

Alternatively, one controller or group of controllers may be configured to capture still images and/or short video clips using the image capture device 136. Then, the user may operate a different second one or more of the controllers 138 to cause the graphical/audio artifact identification and control logic 220 to search for a graphical artifact 130 in the captured still image and/or short video clip. Alternatively, the graphical/audio artifact identification and control logic 220 may be configured to automatically search for a graphical artifact 130 when set into a particular operating mode associated with searching for graphical artifacts 130. Otherwise, the portable media device 134 operates in a mode that captures still images and/or short video clips without searching for a graphical artifact 130.

In a analyzed still image and/or short video clip that does not contain one or more identified graphical artifacts 130, the portable media device 134 takes no actions relating to instructions and/or the supplemental information that might otherwise be encoded into a graphical artifact 130. In some embodiments, a textual or graphical message is presented to the user on the display 140 indicating that no graphical artifact 130 was detected in the captured still image and/or short video clip. (Alternatively, or additionally, an audio message indicating that no graphical artifact 130 was detected in the captured still image and/or short video clip may be presented from the speaker 216 or the audio reproduction device 146.)

However, in instances when the graphical/audio artifact identification and control logic 220 identifies one or more graphical artifacts 130 in the captured still image and/or short video clip, the graphical/audio artifact identification and control logic 220 further processes the graphical artifact 130 to determine the machine readable data that has been encoded into the identified graphical artifact 130. Once the machine readable data has been determined, the portable media device 134 performs one or more operations as specified in the machine readable data. Determining the machine readable data from an image of a graphical artifact 130 is known to one skilled in the arts.

In some operating environments, the user taking an image of a display 126 (intending to obtain supplemental information pertaining to a currently presented media content event) may be relatively far away from the display 126. Thus, a captured image may contain a graphical artifact 130 that is relatively small so that the graphical/audio artifact identification and control logic 220 is unable to discriminate the data markings in the graphical artifact 130 because the graphical artifact 130 is not captured with sufficient detail to meaningfully discern the machine readable data of the graphical artifact 130. Accordingly, the graphical/audio artifact identification and control logic 220 is unable to determine the machine readable data with a sufficient degree of accuracy and/or reliability. Here, the user must then manually operate a zooming function of the image capture device 136 so that an increased sized image is captured that has a larger sized (enlarged) image of the display 126 and/or the graphical artifact 130. Accordingly, the graphical/audio artifact identification and control logic 220 will be able to discern the data markings in the graphical artifact 130 in the zoomed-in captured image to determine the machine readable data with a sufficient degree of accuracy (where the machine readable data instructions are correctly determined) and/or reliability (wherein the portable media device 134 may be operated in a manner as intended under the determined machine readable data).

In an example embodiment, the graphical/audio artifact identification and control logic 220 and the camera controller 212 may cooperatively and automatically operate to automatically perform a zoom function to increase the size of the display 126 in a captured still image and/or short video clip. Further, an automatic focus operation may be concurrently performed with the zoom operation to improve the clarity (focus) of at least the graphical artifact 130 in a captured still image and/or short video clip. Further, the automatic zooming operation may be performed so as to optionally re-orient the display 126 and/or the graphical artifact 130 into the center of the captured at least one image.

An example process may optionally begin with placing the portable media device 134 into an operating mode that is configured to attempt to identify one or more graphical artifacts 130 in a captured still image and/or short video clip. (Alternatively, or additionally, the user may operate one or more of the controllers dedicated to capture a still image and/or short video clip having a graphical artifact 130.) Such image capture device automatic zoom and/or focus operations are well known in the arts wherein a pre-capture image (an image that is analyzed for quality characteristics prior to capture of a still image and/or short video clip that is saved for the user in a memory medium of the portable media device 134) is analyzed to determine zoom and/or focus adjustments needed for capture of a next still image and/or short video clip that has a sufficiently high degree of image resolution. The process of zooming/focusing/image orienting may be iterative, and thus be repeated in an iterative fashion before the capture of a final image with the graphical artifact 130.

The graphical/audio artifact identification and control logic 220 may then analyze a pre-capture image or the like to ascertain if the current field of view of the image capture device 136 is oriented towards a display 126 that is presenting a media content event. Once the display 126 is identified in the field of view, then the graphical/audio artifact identification and control logic 220 may operate the camera controller 212 to zoom in on the regions wherein the display 126 has been identified. Thus, when the next image is captured, that image is analyzed to identify the graphical artifact 130. Because the identified graphical artifact 130 is relatively larger in this captured image (wherein the display 126 has been zoomed or enlarged), the data markings may be discriminated from other parts of the captured still image and/or short video clip so as to be able to determine the machine readable data with a higher degree of accuracy and/or reliability.

Alternatively, or additionally, the graphical artifact 130 itself may be identified in the pre-capture image (or a subsequent pre-capture image if the zoom operation is performed in an incremental manner wherein a series of zoom operations continually increase the relative size of the display 126 in the field of view of the image capture device 136). Here, an embodiment may be configured to further perform a zoom operation to further increase the relative sized of the identified graphical artifact 130. Thus, when the still image and/or short video clip is captured for analysis, the graphical artifact 130 in the captured still image and/or short video clip may be even more discernible.

In an example operating environment, the display 126 presenting a media content event is typically emitting a relatively large amount of light energy such that the video portion of the media content event is readily discernible by viewing users from the background environment. That is, the brightness level (level of light output) of the display 126 is greater than the brightness of other background objects in the operating environment. Thus, an example embodiment analyzes a pre-capture image to identify regions of higher (greater) brightness in the field of view of the image capture device 136. In an example embodiment, edge transitions from identified lower brightness to higher brightness in the pre-capture image may be used to identify the extents of the display 126. Then, the automatic zoom, focus and/or orientation operation may be made so that the region in the field of view having the identified higher brightness levels (where the display 126 is presumably located) in captured for identification and analysis of a graphical artifact 130 presumably being presented on the display 126.

Alternatively, or additionally, a shape recognition process may be performed on an object that is determined to likely be the display 126. One skilled in the arts appreciates that the display 126 is likely to be rectangular in shape, whereas other objects in the background environment are likely to have non-rectangular shapes. Thus, an object shape search of the pre-capture image may be performed by the graphical/audio artifact identification and control logic 220. Then, the automatic zoom, focus and/or orientation operation may be directed towards that region in the field of view having the identified rectangular shaped object (where the display 126 is presumably located).

Characteristics of the presented video content may also be considered when performing an automatic zoom, focus and/or orientation operation. In an example embodiment, identification of straight edges and/or non-moving edges in the pre-capture image may identify the extents of the display 126. Such an object-based search feature combined with a brightness detection feature will result in the identification of the display 126 in the operating environment with a reasonably high degree of accuracy (where the zoom and/or focus operation is directed to the display 126) and/or reliability (wherein the display 126 is correctly identified from other background objects).

Some embodiments may be configured to identify the graphical artifact 130 itself in the pre-capture image. Line patterns, color palette and/or other characteristics of the graphical artifact 130 may be used to discriminate the graphical artifact 130 from the video of the presented media content event. For example, a graphical artifact 130 will not have any moving portions, so an absence of moving edges may be used to discriminate the graphical artifact 130 from the presented video content. A graphical artifact 130 may have known colors, such as black data marks on a white background. Thus, a color palette analysis process that identifies a regions in the pre-capture image having only black and white color may be used to discriminate the graphical artifact 130 from the presented video content that has other colors.

In some embodiments, the location of graphical artifact 130 is predefined to be in a specific location on the display 126, such as the example graphical artifact 130*b* (FIG. 1). Alternatively, or additionally, the graphical artifact 130 may be located at a specific location in the presented video content, such as the example graphical artifact 130*a* that is located in the upper right corner of the video image of the media content event. That is, the graphical artifact 130 may be in a predefined location that has been stored and/or is accessible by the graphical/audio artifact identification and control logic 220. Accordingly, the graphical/audio artifact identification and control logic 220 can operate the camera controller 212 to zoom, focus and/or orient the captured image so that the predetermined region of the display 126 that is expected to be presenting the graphical artifact 130 is captured.

In embodiments that employ an audio artifact 152, the graphical/audio artifact identification and control logic 220 analyses sounds detected by the microphone 204 to determine if an audio artifact 152 is present. If an audio artifact 152 is detected, the graphical/audio artifact identification and control logic 220 further processes the audio artifact 152 to determine the machine readable data that has been encoded into the identified audio artifact 152.

After the machine readable data has been determined by the graphical/audio artifact identification and control logic 220, the portable media device 134 may be operated in accordance with the instructions and/or the supplemental information determined from machine readable data. An example operation may be to cause the portable media device 134 to establish a communication link 150 to the remote information system 148 to access and retrieve supplemental information. Alternatively, or additionally, the remote information system 148 may schedule the associated media content event for communication to the user's portable media device 134 and/or the user's media device 102 for presentation and/or for storing. Alternatively, or additionally, the remote information system 148 or the portable media device 134 may establish a communication link to the media device 102 to schedule a recording of a later broadcast or presentation of the media content event at the user's media device 102. Alternatively, or additionally, the remote information system 148 and/or the portable media device 134 may operate the media device 102 to store the supplemental information accessed from the remote information system 148 for later presentation to the user.

In some embodiments, one or more of the operations performed by the portable media device 134 and/or other electronic devices may be subscription-based. That is, if the user has subscribed for a particular service, typically by paying a supplemental fee for the subscription service, the operation defined by the graphical artifact 130 is performed only if the user is a subscriber.

For example, an embodiment of the portable media device 134 may not have the graphical/audio artifact identification and control logic 220 unless the user is a subscriber. Alternatively, or additionally, the graphical/audio artifact identification and control logic 220 may be inoperable, or have limited operability, if the user is not a subscriber. For example, text determined from an identified graphical artifact 130 may be presented on the display 140 of the portable media device 134 for all users, however access to the remote information system 148 may be permitted only for subscribing users.

Subscriptions may be determined in a variety of manners in the various embodiments. In an example embodiment, logic in the graphical/audio artifact identification and control logic 220 may be configured to operate only after authorization. Alternatively, or additionally, the graphical/audio artifact identification and control logic 220 may be limited to perform one or more specific operations determined from the machine readable data based on information encoded into the graphical artifact 130 itself. For example, the graphical artifact 130 may include textual information such as the title or the like that is to be presented on the display 140 of the portable media device 134 (a first kind of operation) and may include operation instructions to access the remote information system 148 only if the user is a subscriber (a second kind of operation).

Alternatively, or additionally, some graphical artifacts 130 may have a security code or the like as part of the machine readable data. Here, the user of the portable media device 134 must have a suitable response to the security code or the like that is obtained by the user and/or the portable media device 134 that is provided as part of the subscription. For example, the user and/or the portable media device 134 may be required to provide a password or the like. In the absence of a suitable response to the security code, the portable media device 134 may not operate to determine the machine readable data and/or may not perform the proscribed operation determined from the machine readable data.

Alternatively, or additionally, all of or part of the machine readable data of some graphical artifacts 130 may be encrypted or the like such that in the absence of a suitable key for decoding the encrypted information, the portable media device 134 may not be able to decode (decrypt) the encrypted machine readable data. Here, the user and/or the portable media device 134 must have been provided a decryption key prior to capturing the still image and/or short video clip having the graphical artifact 130.

Figure 3:
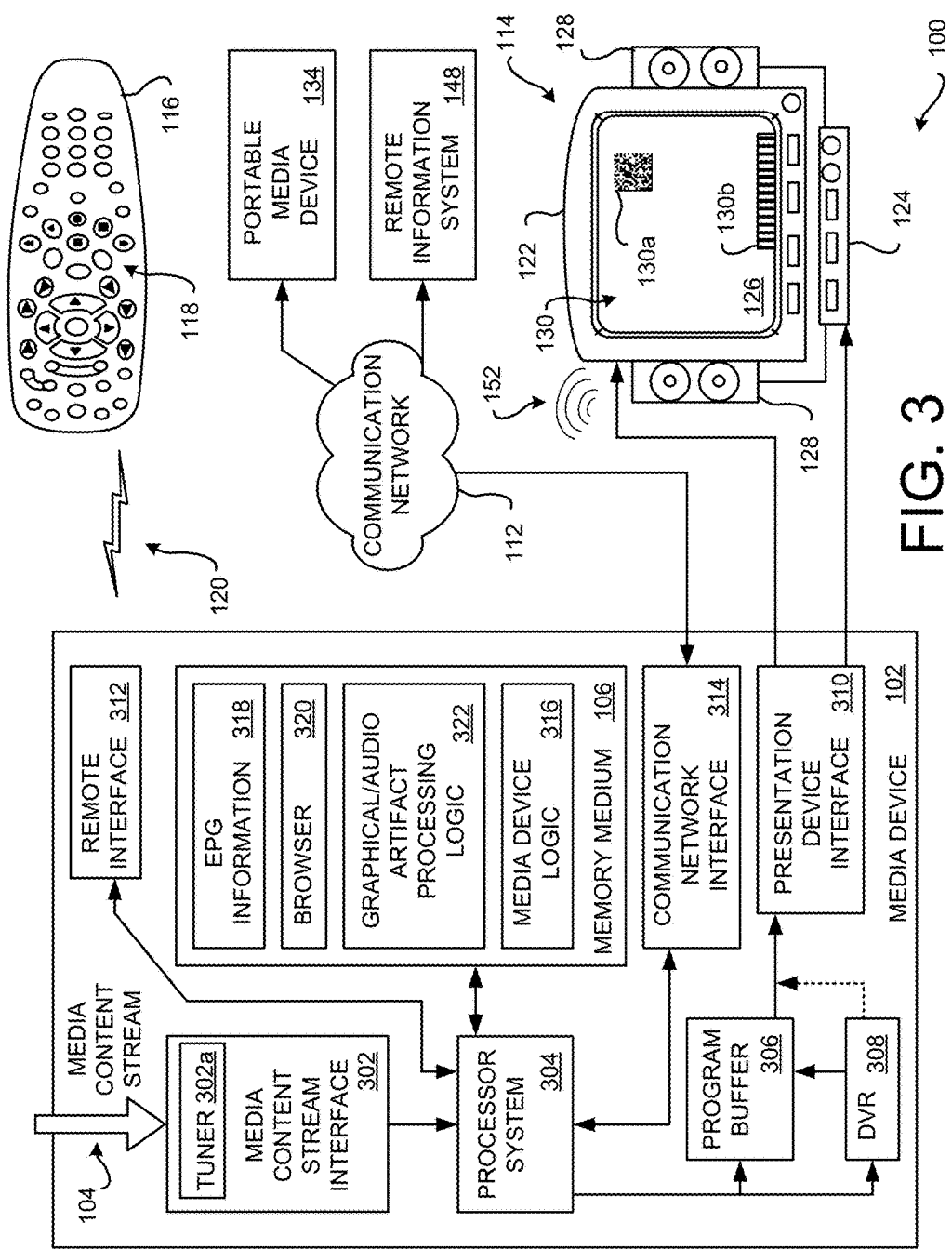
FIG. 3 is a block diagram of an exemplary embodiment of the media device provisioned with an embodiment of the media content event information system.

FIG. 3 is a block diagram of an exemplary embodiment of the media device 102 provisioned with an embodiment of the media content event information system 100. Embodiments of the media content event information system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 104.

The non-limiting exemplary media device 102 comprises a media content stream interface 302, a processor system 304, a memory medium 106, a program buffer 306, an optional digital video recorder (DVR) 308, a presentation device interface 310, a remote interface 312, and an optional communication network interface 314. The memory medium 106 comprises portions for storing the media device logic 316, the electronic program guide (EPG) information 318, an optional browser 320, and the graphical/audio artifact processing logic 322. In some embodiments, the media device logic 316, the browser 320, and/or the graphical/audio artifact processing logic 322 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 302. In a broadcast environment, one or more tuners 302a in the media content stream interface 302 selectively tune to one of the media content streams 104 in accordance with instructions received from the processor system 304. The processor system 304, executing the media device logic 316 and based upon a request for a media content event of interest specified by a user, parses out media content associated with the media content event of interest. The media content event of interest is then assembled into a stream of video and/or audio information which may be stored by the program buffer 306 such that the media content can be streamed out to components of the media presentation system 114, such as the visual display device 122 and/or the audio presentation device 124, via the presentation device interface 310. Alternatively, or additionally, the parsed out media content may be saved into the DVR 308 for later presentation. The DVR 308 may be directly provided in, locally connected to, or remotely connected to, the media device 102.

From time to time, information populating the EPG 318 portion of the memory medium 106 is communicated to the media device 102, via the media content stream 104 or via another suitable media. The EPG 318 portion of the memory medium 106 stores the information pertaining to the scheduled programming of media content events. The information may include, but is not limited to, a scheduled presentation start and/or end time, a program channel, and descriptive information. As noted herein, an example operation defined by the machine readable data of a graphical artifact 130 may cause the media device to record a media content event in the DVR 308. The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 318 is retrieved, formatted, and then presented on the display 126 as an EPG (not shown).

The processes performed by the media device 102 relating to the processing of the received media content stream 104 and communication of a presentable media content event to the components of the media presentation system 106 are generally implemented by the processor system 304 while executing the media device logic 316. Thus, the media device 102 may perform a variety of functions related to the processing and presentation of one or more media content events received in the media content stream 104.

Embodiments of the media device 102 may be configured to perform one or pre operations pertaining to presentation of a graphical artifact 130 on the display 126. Such operations are generally implemented by the processor system 304 while executing the graphical/audio artifact processing logic 322 and the media device logic 316.

In an example embodiment, the graphical artifact 130 is separately provided to the media device 102, via the media content stream 104 and/or via the communication network 112 from another electronic device. Here, the graphical/audio artifact processing logic 322 determines the location of the presentation of the graphical artifact 130 on the display 126. In some instances, the graphical artifact 130 includes associated information specifying a predefined location of display for the graphical artifact 130.

In other instances, the graphical/audio artifact identification and control logic 220 automatically determines a location of presentation for the graphical artifact 130. For example, if the media content event is presented in a letter box format, the graphical/audio artifact identification and control logic 220 may identify a portion of the display that is not being used to present the video portion of the media content event. Then, the location of the graphical artifact 130 may be defined based on identification of the unused portion of the display 126, such as illustrated by the example graphical artifact 130b (FIG. 1).

Alternatively, or additionally, the graphical/audio artifact identification and control logic 220 may identify a region in the video that is likely not to overly distract the user when the graphical artifact 130 is presented. For example, a color palette analysis and/or edge movement analysis may be performed to identify a region of the video image have single color, or substantially single similar colors, and/or few or no moving edges. The preferred colors may be predefined. For example, a portion of the video image may present an area associated with blue sky or with water having a palette of similar colors and/or few moving edges. Once such a region is identified in the video portion of the media content event, the graphical artifact 130 may then be presented therein.

In some embodiments, presentation of the graphical artifact 130 is maintained for some duration that permits the user to visible discern and recognize presence of the graphical artifact 130, and to then orient their portable media device 134 so as to be able to capture a still image and/or short video clip of the display 126 while the graphical artifact 130 is being presented. In some embodiments, the graphical artifact 130 may be periodically presented a plurality of times to provide the user multiple opportunities to capture a still image and/or short video clip that is likely to have one or more graphical artifacts 130. In embodiments wherein the graphical artifact 130 is included with the media content event that is received in the media content stream, the timing and/or duration of presentation of a graphical artifact 130 is predetermined by the content provider, the producers or other entities involved with the creation and/or communication of the media content event.

In some embodiments, the graphical artifact 130 may not be discernible to the user. That is, the user cannot visible perceive (see) the presented graphical artifact 130. Here, the user simply captures a still image and/or short video clip that presumably includes at least one graphical artifact 130.

One skilled in the art appreciates that the video portion of a media content event is an ordered sequential presentation of a series of still images that create the illusion of moving objects in the display 126. Typically, a sufficient number of individual image frames are presented each second to the user, such as 24 frames to 72 image frames per second. The threshold of human visual perception may be as much as 100 milliseconds, though some characteristics of a video can be perceived in as few as 16 milliseconds.

When 24 image frames per second are being presented to the user, a single video frame is being presented for approximately 42 milliseconds. If the graphical artifact 130 is presented in a particular location in one image frame, and then its location is changed in the next image frame that is presented 42 milliseconds later, and so on, the user will not be able to perceive the presented graphical artifact 130 because the location of the graphical artifact 130 never remains in a single location for a duration that exceeds the human visual perception threshold. Accordingly, when a still image and/or short video clip is captured using the portable media device 134, the likelihood that any particular still image or image frame (of a short video clip) will have a discernible graphical artifact 130 therein will be relatively high. That is, even though the user cannot perceive the graphical artifact 130, the machine readable data in the graphical artifact 130 will be determinable from a captured still image and/or short video clip.

In an example embodiment wherein the graphical artifact 130 is not visibly discernible by the user, the presentation location of the graphical artifact 130 may be changed from one frame to a subsequently presented frame (or from a presentation location in one group of frames to a different presentation location in another group of later presented frames). Since the presentation location for a presented graphical artifact 130 is constantly changing, the presented graphical artifact 130 does not remain in a particular location for a long enough duration for the user to discern presence of the graphical artifact 130. However, a captured image and/or short video clip will have captured the image of the graphical artifact 130.

Figure 4:
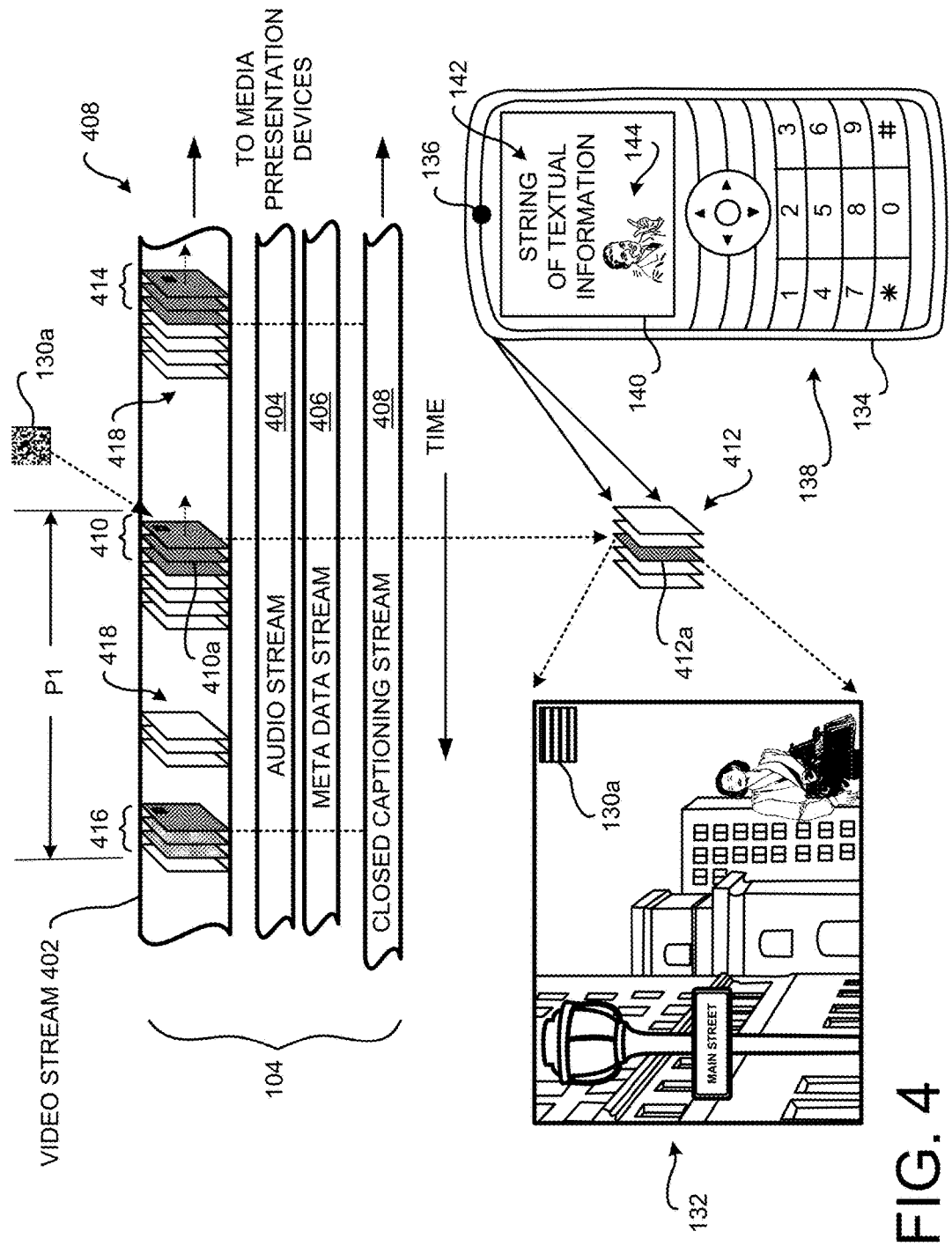
FIG. 4 conceptually illustrates a media content stream that communicates, transports, or otherwise carries, the media content event to the media device.

FIG. 4 conceptually illustrates a media content stream 104 that communicates, transports, or otherwise carries, the media content event to the media device 102 and/or the portable media device 134 (FIG. 1). The media content stream 104 comprises a video stream 402, a corresponding audio stream 404, and a corresponding metadata stream 406.

The video stream 402 is comprised of a plurality of serially sequenced video frames 408. Each video frame 408, which is a single still image, has data or information used to render and present a particular image of the media content event. The video frames 408 are serially presented so as to create a moving picture.

The audio stream 404 may include spoken words, music, and background sounds. The audio stream 404 is sequenced with the video frames 408 such that spoken words, music, and background sounds of the audio stream 404 correspond in time with the presented moving picture. Some media content events have multiple language tracks that present the spoken dialogue of the media content event in different languages. Alternatively, multiple audio streams 404 may be used, each with a different language for the spoken dialogue of the media content event.

Some media content streams 104 may optionally include a metadata stream 406 which contains other information of interest. For example, the title of the media content event may be included in the metadata stream 406. The metadata stream 406 may include synchronization information that is associated with presentation of a graphical artifact 130. Thus, presentation timing of a graphical artifact 130 that is separately communicated to the media device 102 may be controlled so as to occur at a predefined time or point during presentation of the media content event.

An optional closed captioning stream 408 is also conceptually illustrated as part of the media content stream 104. The closed captioning stream 408 is typically a textual presentation of the words of the dialogue audio stream 404 for hearing impaired viewers or for viewers in an area with relatively loud ambient noise levels, such as a bar or the like. The words of the closed captioning stream 408 are sequenced so as to generally correspond to the spoken words of the audio stream 404. Some media content events have multiple closed caption languages that present the spoken dialogue of the media content event in different languages. Alternatively, multiple closed captioning stream 408 may be used, each with a different language for the spoken dialogue of the media content event.

One skilled in the art appreciates that if the portable media device 134 captures a single still image, the captured still image must be captured at precisely the same moment in time that the video frame with a graphical artifact 130 is being presented on the display. A single still image capture may be acceptable in situations where the graphical artifact 130 is being presented for a relatively long duration (so as to provide the user the necessary time to orient their portable media device 134 towards the display 126 and effect an image capture). However, if the graphical artifact 130 is being presented for only a short duration (so as to be presented for a duration that is less than the human visual perception threshold), capture of a still image that includes an image of the graphical artifact 130 is highly problematic. Further, image capture must be completed before a next video frame without a presented graphical artifact 130 (otherwise, the image of the graphical artifact 130 may not be sufficiently clear or detailed so as to enable determination of the machine readable data of the graphical artifact 130).

In the example video stream 402 illustrated in FIG. 4, three adjacent still image frames 410 are illustrated. These three adjacent image frames 410 each have at least one graphical artifact 130 presented in the same presentation location in the image frame 410. Thus, when a single image 412a is captured by the portable media device 134, that captured image 412a will contain a clear and sufficiently detailed image of the graphical artifact 130 (as conceptually indicated in the image 132).

However, the act of capturing the image 412a during presentation of the three adjacent video frames is appreciated by one skilled in the art to be somewhat problematic. Accordingly, in the example embodiment illustrated in FIG. 4, the portable media device 134 is configured to capture a short duration video clip comprising a series of still images 412. Here, at least one captured still image (image 412a) will be captured having the graphical artifact 130. In such an embodiment, each of the individual captured still images are analyzed by the graphical/audio artifact identification and control logic 220 (FIG. 2) to identify the at least one captured still image 412a having the graphical artifact 130 with sufficient clarity and detail so that the machine readable data can be accurately and reliably determined.

In other embodiments, two, or more than three, adjacent video frames may include the commonly located graphical artifact 130. In some instances, a sufficient number of adjacent video frames will have the commonly located graphical artifact 130 such that the total presentation duration of video frames with the graphical artifact 130 is at, or just below, the duration for the human visual perception threshold.

However, some embodiments may have a total duration of adjacent video frames with the commonly located graphical artifact 130 that exceeds the human visual perception threshold, wherein the graphical artifact 130 becomes perceptible to the user for at least some amount of time. Here, the user will receive a visible clue that additional information may be obtained by using their portable media device 134 to capture an image of the display 126.

Some embodiments may be further configured to identify a plurality of captured still images 412a in the captured short duration video clip, each having the graphical artifact 130. The machine readable data is determined for two or more of the identified still images 412a. Then, the machine readable data determined from each different still image 412 are compared to verify the accuracy of the decoding of the machine readable data from the graphical artifact 130. That is, the operation is performed by the portable media device 134 when the first machine readable data determined from a first captured image frame is the same as (matches or corresponds to) the second machine readable data determined from a second captured image frame. Alternatively, if one or more portions of the machine readable data cannot be determined from one particular image, then error correction may be made based on machine readable data determined from other captured images.

In an example embodiment, the group of adjacent image frames having a graphical artifact 130 are periodically repeated. For example, the group of the video frames 416 are presented at the end of the period P1 and a second group of three video frames 410 are presented at the beginning of the period P1. Thus, during the duration of the period P1, two groups of video frames 410, 416 (each with the graphical artifact 130) are presented. Here, the duration of the short video clip captured by the portable media device 134 is equal to or greater than the duration of the period P1. Accordingly, at least one of the still images 412 captured by the portable media device 134 during the capture duration that is at least equal to the duration of the period P1 will have at least one image 412 from which the machine readable data can be determined there from.

Preferably, the capture duration of the short video clip made by the portable media device 134 is greater than the duration of the period P1. Accordingly, at least one group of adjacent video frames with a graphical artifact 130 will be captured by the portable media device 134. Here, the user simply needs to initiate capture of the short video clip using their portable media device 134. The user will not be able to perceive the presented graphical artifact 130 since the total presentation time of the graphical artifact 130 is any single grouping of image frames will be less than their human visual perception threshold, yet the duration of capture of the short video clip will be sufficiently long enough to ensure capture of at least one still image 412a having a discernible graphical artifact 130.

In some embodiments, a series of adjacent video frames 414 will have the graphical artifact 130 shown at a first presentation location. Then, shortly thereafter, or immediately thereafter, a series of later presented video frames 412 will have the same graphical artifact 130 shown in a different second presentation location. (Optionally, intervening video frames 418 with no graphical artifact 130 may be used between the two successive series of video frames.) Since the graphical artifact 130 is not shown at a presentation location for any duration that exceeds the human visual perception threshold, the user will not be able to perceive (see) the presented graphical artifact 130.

It should be emphasized that the above-described embodiments of the media content event information system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method, comprising:
   presenting a graphical artifact on a portion of a display concurrently with presentation of a video portion of a media content event, wherein the graphical artifact has machine readable data encoded thereon using a plurality of data marks;
   identifying, in a pre-capture image captured by a portable media device provisioned with an image capture device, the display that is shown in a field of view of the image capture device;
   automatically performing a zooming operation with the image capture device;
   capturing, using the portable media device provisioned with the image capture device, at least one image that includes the display that is presenting the graphical artifact wherein at least a size of the display is enlarged in the image captured by the portable media device as a result of the automatic zoom operation;
   identifying the graphical artifact in the captured at least one image;
   determining the machine readable data based on the identified graphical artifact; and
   operating the portable media device to perform at least one operation based on the determined machine readable data.

2. The method of claim 1, wherein the machine readable data of the graphical artifact includes textual information pertaining to the presented media content event, and wherein the at least one operation performed by the portable media device comprises:
   displaying the textual information on a display of the portable media device.

3. The method of claim 1, wherein the machine readable data of the graphical artifact includes information to communicatively couple the portable media device with a remote information system via a communication network, and wherein the at least one operation performed by the portable media device comprises:

receiving, at the portable media device, supplemental information from the remote information system; and presenting the received supplemental information using the portable media device.

4. The method of claim 3, wherein presenting the supplemental information using the portable media device comprises:

displaying a stream of closed captioning text on the display of the portable media device, wherein a language of the presented closed captioning text is different from a language used in dialogue of the presented media content event.

5. The method of claim 3, wherein presenting the supplemental information using the portable media device comprises:

presenting an audible audio stream with at least dialogue using the portable media device, wherein a language of the presented audible audio stream dialogue is different from a language used in audible dialogue of the presented media content event.

6. The method of claim 1, further comprising:

separately receiving the graphical artifact and the media content event at a media device that is controlling presentation of the media content event on the display;

wherein presenting the graphical artifact on the portion of the display currently with presentation of the video portion of the media content event comprises:

determining, at the media device, a region of the display that is not being used to present the video portion of the media content event; and defining, at the media device, a presentation location for the graphical artifact in the identified region of the display that is not being used for display of the media content event, wherein the graphical artifact is presented in the defined presentation location.

7. The method of claim 1, wherein presenting the graphical artifact on the portion of the display currently with presentation of the video portion of the media content event comprises:

presenting the graphical artifact in a predefined region of the display, wherein the presented graphical artifact completely obscures a portion of the media content event that corresponds to the predefined region that is used for presentation of the graphical artifact.

8. The method of claim 1, wherein the video portion of the media content event comprises a series of serially presented video frames, and wherein presenting the graphical artifact comprises:

presenting the graphical artifact on at least three adjacent video frames, wherein a duration of the presentation of the graphical artifact is less than a duration of a human visual perception threshold such that a viewer is not able to perceive presentation of the graphical artifact; and subsequently presenting the next ones of the video frames without presentation of the graphical artifact, wherein at least one still image captured by the portable media device includes at least one of the at least three video frames having the presented graphical artifact, and wherein the machine readable data is determinable from at least one of the at least three adjacent video frames having the presented graphical artifact.

9. The method of claim 8, wherein the at least one of the at least three video frames having the presented graphical artifact is a first video frame, wherein determined machine readable data determined from the first video frame is first machine readable data, the method further comprising:

identifying the graphical artifact in an adjacent second video frame that also presented the graphical artifact;

determining second machine readable data from the graphical artifact presented in the second video frame; and comparing the first machine readable data and the second machine readable data, wherein the at least one operation is performed by the portable media device when the first machine readable data is the same as the second machine readable data.

10. The method of claim 1, wherein prior to presenting the graphical artifact on the portion of the display, the method further comprising:

receiving the media content event in a media content stream at a media device that controls presentation of the media content event on the display;

communicating the video portion of the media content event from the media device to the display for presentation;

receiving, at the media device, information that defines the at least one operation that is to be performed by the portable media device;

generating, at the media device, the graphical artifact; and communicating the graphical artifact from the media device to the display for presentation on the display.

11. A method, comprising:

presenting a graphical artifact on a portion of a display concurrently with presentation of a video portion of a media content event, wherein the graphical artifact has machine readable data encoded thereon using a plurality of data marks, wherein the video portion of the media content event comprises a series of serially presented video frames, and wherein presenting the graphical artifact comprises:

presenting the graphical artifact in a first one of the series of serially presented video frames, wherein the graphical artifact is presented at a first presentation location on the display; and presenting the graphical artifact in a second one of the series of serially presented video frames, wherein the graphical artifact is presented at a second presentation location on the display, wherein the second presentation location is different from the first presentation location;

capturing, using a portable media device provisioned with an image capture device, at least one image that includes the display that is presenting the graphical artifact, wherein the portable media device captures at least one still image that has the graphical artifact presented at the first presentation location or at the second presentation location;

identifying the graphical artifact in the captured at least one image;

determining the machine readable data based on the identified graphical artifact; and operating the portable media device to perform at least one operation based on the determined machine readable data.

12. A method, comprising:
presenting a graphical artifact on a portion of a display concurrently with presentation of a video portion of a media content event, wherein the graphical artifact has machine readable data encoded thereon using a plurality of data marks, wherein the video portion of the media content event comprises a series of serially presented video frames, and wherein presenting the graphical artifact comprises:
  presenting the graphical artifact in a first group of adjacent serially presented video frames,
    wherein the graphical artifact is presented at a first presentation location on the display in each of the first group of adjacent serially presented video frames,
    and wherein a first total presentation duration of the graphical artifact at the first presentation location is less than a duration of a human visual perception threshold such that a user of the portable media device is not able to perceive the presentation of the graphical artifact presented at the first presentation location; and
  subsequently presenting the graphical artifact in a second group of adjacent serially presented video frames,
    wherein the graphical artifact is presented at a second presentation location on the display in each of the second group of adjacent serially presented video frames,
    wherein a second total presentation duration of the graphical artifact at the second presentation location is less than the duration of the human visual perception threshold such that the user of the portable media device is not able to perceive the presentation of the graphical artifact presented at the second presentation location, and
    wherein the second presentation location is different from the first presentation location,
capturing, using a portable media device provisioned with an image capture device, at least one image that includes the display that is presenting the graphical artifact, wherein the portable media device captures at least one still image that has the graphical artifact presented at the first presentation location or at the second presentation location, and
identifying the graphical artifact in the captured at least one image;
determining the machine readable data based on the identified graphical artifact; and
operating the portable media device to perform at least one operation based on the determined machine readable data.

13. A method, comprising:
presenting a graphical artifact on a portion of a display concurrently with presentation of a video portion of a media content event, wherein the graphical artifact has machine readable data encoded thereon using a plurality of data marks;
identifying, in a pre-capture image captured by a portable media device provisioned with an image capture device, the display that is shown in a field of view of the image capture device,
wherein an orientation operation is performed to re-orient the display into a center of a captured at least one image;
capturing, using the portable media device, at least one image that includes the display that is presenting the graphical artifact;
identifying the graphical artifact in the captured at least one image;
determining the machine readable data based on the identified graphical artifact; and
operating the portable media device to perform at least one operation based on the determined machine readable data.

14. The method of claim 13, wherein the pre-capture image is a first pre-capture image, the method further comprising:
identifying, in a second pre-capture image, the graphical artifact that is shown in the field of view of the image capture device,
performing an automatic zooming operation with the image capture device,
wherein a size of the graphical artifact is enlarged in the image captured by the portable media device.

15. The method of claim 13, further comprising:
performing an automatic focusing operation with the image capture device to focus the graphical artifact in the image captured by the portable media device.

16. A portable media device comprising:
an image capture device;
a display;
a transceiver; and
a processor system communicatively coupled to the image capture device, the display, and the transceiver, wherein the processor system is configured to:
  identify, in a pre-capture image captured by the portable media device provisioned with the image capture device, the display that is shown in a field of view of the image capture device;
  re-orient the display into a center of a next captured at least one image that is to be captured by the image capture device, wherein the next captured at least one image includes at least one graphical artifact that is concurrently presented with a video portion of a media content event on the display, wherein the graphical artifact has machine readable data encoded thereon using a plurality of data marks that is configured to control at least one operation of the portable media device;
  automatically perform a zooming operation with the image capture device, wherein at least a size of the display is enlarged in the next captured at least one image that is captured by the portable media device; and
  determine the machine readable data from the captured image with the graphical artifact;
where in response to determining the machine readable data, the processor system is further configured to:
  operate the portable media device in accordance with the machine readable data.

17. The portable media device of claim 16, wherein the machine readable data determined from the graphical artifact comprises textual information, and wherein the processor system is further configured to:
present the textual information on the display of the portable media device.

18. The portable media device of claim 16, wherein the machine readable data determined from the graphical artifact comprises information to establish a communication link to a remote information system and to request supplemental information accessible from the remote information system, and wherein the processor system is further configured to:
- establish the communication link to the remote information system in response to determining the machine readable data; and
- receive the supplemental information from the remote information system, wherein the supplemental information is closed captioning text in a language that is different from the language of audible dialogue of the presented media content event; and
- present the closed captioning text in synchronism with the video portion of the media content event being presented on the display.

* * * * *